United States Patent
Lin et al.

(10) Patent No.: US 11,372,466 B1
(45) Date of Patent: Jun. 28, 2022

(54) POWER SAVING METHOD FOR PERIPHERAL DEVICE

(71) Applicant: Primax Electronics Ltd., Taipei (TW)

(72) Inventors: Yun-Jung Lin, Taipei (TW); Shih-Chi Lee, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/330,745

(22) Filed: May 26, 2021

(30) Foreign Application Priority Data

Mar. 5, 2021 (TW) .................................. 110107859

(51) Int. Cl.
*G06F 1/32* (2019.01)
*G06F 1/3215* (2019.01)

(52) U.S. Cl.
CPC .................................. *G06F 1/3215* (2013.01)

(58) Field of Classification Search
CPC ........................................................ G06F 1/32
See application file for complete search history.

(56) References Cited

U.S. PATENT DOCUMENTS

| | | | | |
|---|---|---|---|---|
| 2004/0113890 A1* | 6/2004 | Ranta | ..................... | G06F 1/3259 345/166 |
| 2005/0110776 A1* | 5/2005 | Tan | .......... | G06F 1/325 345/179 |
| 2007/0013550 A1* | 1/2007 | Xie | ......... | G06F 1/3259 340/901 |
| 2008/0100577 A1* | 5/2008 | Sutardja | ................ | G06F 3/0312 345/166 |
| 2008/0136781 A1* | 6/2008 | Chang | ................... | G06F 3/0383 345/166 |

* cited by examiner

*Primary Examiner* — Paul B Yanchus, III
(74) *Attorney, Agent, or Firm* — Kirton McConkie; Evan R. Witt

(57) ABSTRACT

A power saving method for a peripheral device in a wireless operation mode is provided. The power saving method at least includes the steps of allowing the peripheral device to enter an idle mode and judging whether the peripheral device receives a startup trigger event. In the idle mode, the light source in an operation region of the peripheral device is in an on state or a high-brightness state. If the peripheral device receives the startup trigger event, the peripheral device is switched from the idle mode to a power saving mode. In the power saving mode, the light source in the operation region of the peripheral device is in an off state or a low-brightness state. The peripheral device in the power saving mode consumes less electric power than the peripheral device in the idle mode.

12 Claims, 7 Drawing Sheets

POWER SAVING METHOD FOR PERIPHERAL DEVICE

FIELD OF THE INVENTION

The present invention relates to a power saving method for a peripheral device, and more particularly to a power saving method for a peripheral device in a wireless operation mode.

BACKGROUND OF THE INVENTION

Nowadays, a variety of peripheral devices are widely applied to computers (including laptops), mobile phones or other main systems. For example, the peripheral devices include a mouse device, a keyboard device, a wireless microphone, a headset or any other possible electronic device. The technologies about the functions of the peripheral devices are continuously enhanced or improved. In addition, when the peripheral devices are designed, the use experiences of the consumers about the operations of the peripheral devices are taken into consideration.

Take the currently popular gaming mouse or gaming keyboard as an example of the peripheral device. The gaming mouse or the gaming keyboard is usually designed to provide many dazzling LED light effects to attract the attention of the consumers and satisfy the user experience. In case that the gaming mouse or the gaming keyboard is in a wired operation mode, the gaming mouse or the gaming keyboard acquires electric power through a wired USB port. Under this circumstance, it is not necessary to care about or limit the use time or the current consumption of the gaming mouse or the gaming keyboard. Whereas, in case that the gaming mouse or the gaming keyboard is in a wireless operation mode or switched from the wired operation mode to the wireless operation mode, the gaming mouse or the gaming keyboard acquires electric power through a chargeable battery (or a backup battery) in order to exchange data with the main system. Generally, the power consumption amount of the gaming mouse or the gaming keyboard for providing the LED light effect occupies a relatively high proportion of the overall power consumption amount of the gaming mouse or the gaming keyboard. In case that the peripheral device is in the wireless operation mode, it is an important technical issue to save the power consumption of the LED light effect in order to extend the service life of the battery or the operation time of the user while satisfying the current trends of gradually emphasizing the use experience of the consumers during operation. Similarly, it is important for other types of peripheral devices in the wireless operation mode to improve the power saving efficacy.

SUMMARY OF THE INVENTION

An object of the present invention provides a power saving method for various peripheral devices in a wireless operation mode.

Another object of the present invention provides a power saving method for various peripheral devices in response to a startup trigger event.

In accordance with an aspect of the present invention, a power saving method for a peripheral device in a wireless operation mode is provided. The power saving method at least includes the steps of allowing the peripheral device to enter an idle mode and judging whether the peripheral device receives a startup trigger event. If the peripheral device does not receive the startup trigger event, the step of judging whether the peripheral device receives the startup trigger event is repeatedly performed. If the peripheral device receives the startup trigger event, the peripheral device enters a power saving mode from the idle mode. The peripheral device in the power saving mode consumes less electric power than the peripheral device in the idle mode.

In an embodiment, after the peripheral device enters the idle mode, the power saving method further includes a step of judging whether the peripheral device has been operated in the idle mode for a time period longer than a first time interval. If the peripheral device has been operated in the idle mode for the time period longer than the first time interval, the peripheral device enters a suspend mode. If the peripheral device has been operated in the idle mode for the time period not longer than the first time interval, the step of judging whether the peripheral device receives the startup trigger event is repeatedly performed. If the peripheral device does not receive the startup trigger event, the step of judging whether the peripheral device has been operated in the idle mode for the time period longer than the first time interval is repeatedly performed.

In an embodiment, after the peripheral device enters the suspend mode, the power saving method further includes a step of judging whether the peripheral device receives a wakeup event. If the peripheral device does not receive the wakeup event, the step of judging whether the peripheral device receives the wakeup event is repeatedly performed. If the peripheral device receives the wakeup event, the peripheral device enters the idle mode.

In an embodiment, the peripheral device has an operation region, and the peripheral device includes plural light sources, wherein first portions of the plural light sources are included in the operation region, and second portions of the plural light sources are located outside the operation region.

In an embodiment, when the peripheral device is in the idle mode, the light sources in the operation region are in an on state or a high-brightness state, so that the peripheral device is in a high power consumption state. When the peripheral device is in the power saving mode, at least one of the light sources in the operation region is in an off state or a low-brightness state, so that the peripheral device is in a low power consumption state.

In an embodiment, when the peripheral device is in the suspend mode, the first portions of the plural light sources and/or the second portions of the plural light sources are all in an off state or a low-brightness state, so that the peripheral device is in a very low power consumption state.

In an embodiment, the peripheral device is a mouse device, and the operation region includes a mouse casing region and/or a mouse roller region of the mouse device to be pressed, held or controlled by a user's hand; or the peripheral device is a keyboard device, the operation region includes a keypad region of the keyboard device with keys to be pressed by the user's hand.

In an embodiment, after the peripheral device enters the power saving mode, the power saving method further includes a step of judging whether the peripheral device has not received the startup trigger event. If the peripheral device has not received the startup trigger event for a time period not longer than a second time interval, the peripheral device is maintained in the power saving mode, and the step of judging whether the peripheral device has not received the startup trigger event is repeatedly performed. If the peripheral device has not received the startup trigger event for the time period longer than the second time interval, the peripheral device enters the idle mode from the power saving mode.

In an embodiment, the peripheral device is operated in the wireless operation mode only, or the peripheral device is selectively operated in the wireless operation mode or a wired operation mode.

In accordance with another aspect of the present invention, a power saving method for a peripheral device in a wireless operation mode is provided. The power saving method at least includes the steps of allowing at least one light source of the peripheral device to enter a first light effect mode and judging whether the peripheral device receives a startup trigger event. If the peripheral device does not receive the startup trigger event, the step of judging whether the peripheral device receives the startup trigger event is repeatedly performed. If the peripheral device receives the startup trigger event, at least one of the at least one light source of the peripheral device in the first light effect mode is switched to a second light effect mode. The at least one light source of the peripheral device in the second light effect mode consumes less electric power than the at least one light source of the peripheral device in the first light effect mode.

In an embodiment, after the at least one light source of peripheral device enters the first light effect mode, the power saving method further includes a step of judging whether the at least one light source of the peripheral device has been operated in the first light effect mode for a time period longer than a first time interval. If the at least one light source of the peripheral device has been operated in the first light effect mode for the time period longer than the first time interval, the at least one light source of the peripheral device to enter a third light effect mode. If the at least one light source of the peripheral device has been operated in the first light effect mode not longer than the first time interval, the step of judging whether the peripheral device receives the startup trigger event is repeatedly performed. If the peripheral device does not receive the startup trigger event, the step of judging whether the at least one light source of the peripheral device has been operated in the first light effect mode for the time period longer than the first time interval is repeatedly performed. The at least one light source of the peripheral device in the third light effect mode consumes less electric power than the at least one light source of the peripheral device in the second light effect mode.

In an embodiment, after the at least one light source of the peripheral device enters the third light effect mode, the power saving method further includes a step of judging whether the peripheral device receives a wakeup event. If the peripheral device does not receive the wakeup event, the step of judging whether the peripheral device receives the wakeup event is repeatedly performed. If the peripheral device receives the wakeup event, the step of allowing the at least one light source of the peripheral device to enter the first light effect mode is repeatedly performed.

In an embodiment, the peripheral device has an operation region. A first portion of the at least one light source of the peripheral device is included in the operation region. A second portion of the at least one light source of the peripheral device is located outside the operation region.

In an embodiment, when the at least one light source of the peripheral device is in the first light effect mode, the first portion of the at least one light source in the operation region and the second portion of the at least one light source outside the operation region are in an on state or a high-brightness state. When the at least one light source of the peripheral device is in the second light effect mode, at least one of the first portion of the at least one light source is in an off state or a low-brightness state, and at least one of the second portion of the at least one light source is still in the on state or the high-brightness state.

In an embodiment, when the at least one light source of the peripheral device is in the third light effect mode, the first portion of the at least one light source in the operation region and/or the second portion of the at least one light source outside the operation region are in an off state or a low-brightness state.

In an embodiment, the peripheral device is a mouse device, and the operation region includes a mouse casing region and/or a mouse roller region of the mouse device to be pressed, held or controlled by a user's hand; or the peripheral device is a keyboard device, the operation region includes a keypad region of the keyboard device with keys to be pressed by the user's hand.

In an embodiment, after the at least one of the at least one light source of the peripheral device enters the second light effect mode, the power saving method further includes a step of judging whether the peripheral device has not received the startup trigger event. If the peripheral device has not received the startup trigger event for a time period not longer than a second time interval, the at least one of the at least one light source is maintained in the second light effect mode, and the step of judging whether the peripheral device has not received the startup trigger event is repeatedly performed. If the peripheral device has not received the startup trigger event for a time period longer than the second time interval, at least one of the at least one light source of the peripheral device in the second light effect mode is switched to the first light effect mode.

In an embodiment, the peripheral device is operated in the wireless operation mode only, or the peripheral device is selectively operated in the wireless operation mode or a wired operation mode.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a power saving method for a peripheral device. An example of the peripheral device includes but is not limited to a mouse device, a keyboard device, a wireless microphone, or a headset. The peripheral device can be operated in a wireless operation mode only, or selectively operated in one of the wireless operation mode and a wired operation mode.

In accordance with a feature of the present invention, at the time when the peripheral device in the wireless operation mode receives a startup trigger event and is ready to frequently perform the actions of transmitting/receiving wireless data, a power saving process is immediately started. For example, after the power saving process is started, the overall power supply of the peripheral device is switched from a standby mode (or an idle mode) to a power saving mode, or some of the LED light effects are disabled or decreased (for example, the LED light sources in a specified region are turned off or the number or the brightness of the LED light sources in the specified region is decreased). Since the power consumption of the LED light effects is saved, the service life of the chargeable battery (or the backup battery) or the operation time of the user is extended.

Hereinafter, a power saving method for a peripheral device in a wireless operation mode will be described when the overall power supply of the peripheral device is taken into consideration.

Figure 1A:
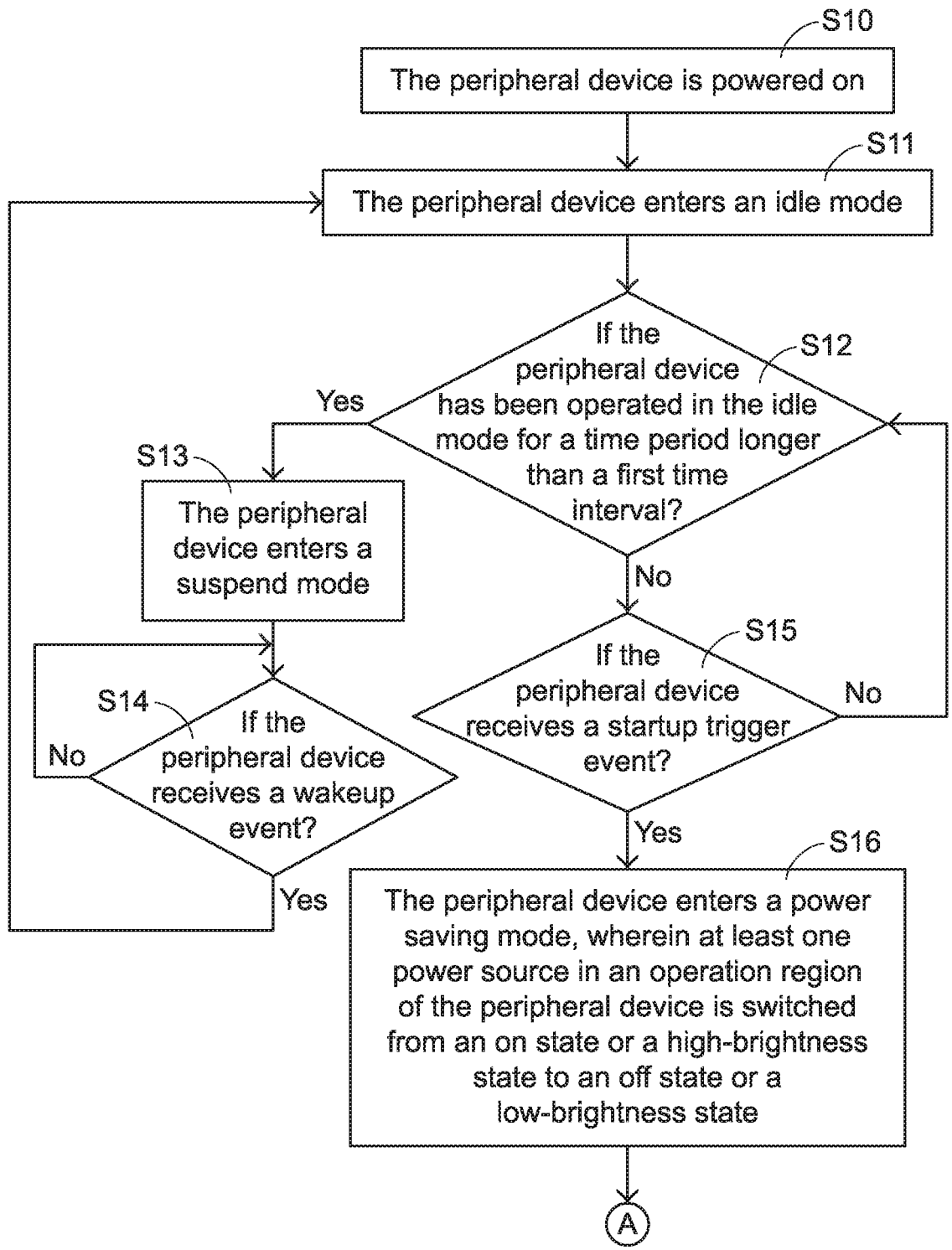
FIGS. 1A and 1B illustrate a flowchart of a power saving method according to a first embodiment of the present invention.
Figure 1B:
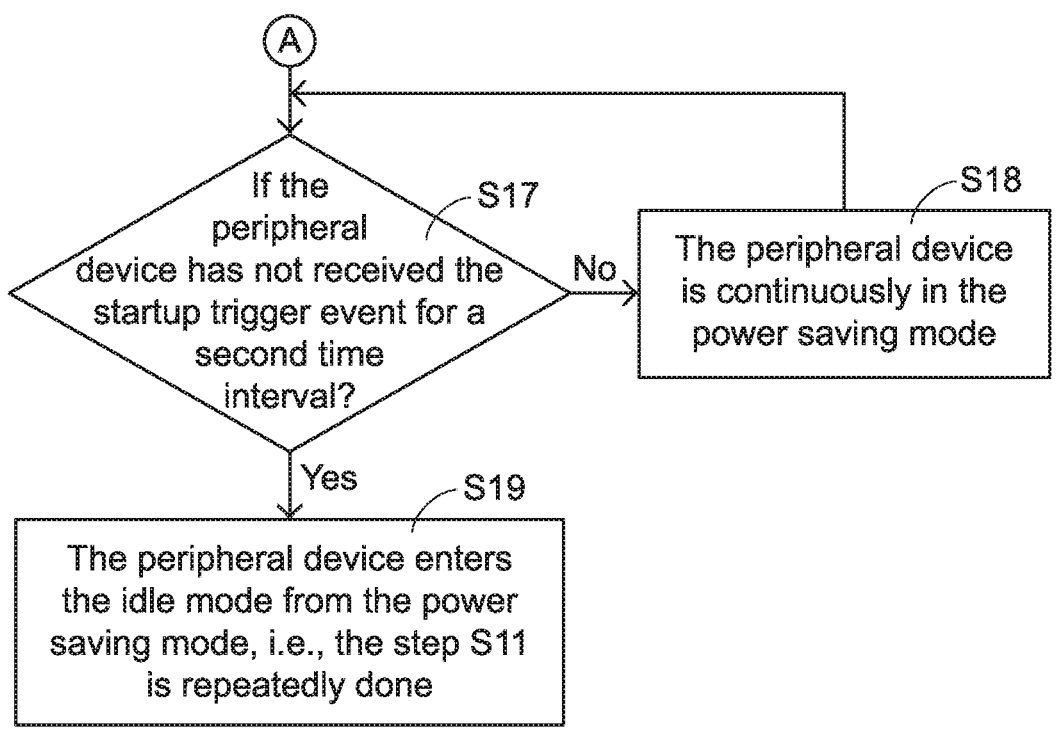

FIGS. 1A and 1B illustrate a flowchart of a power saving method according to a first embodiment of the present invention. The power saving method is applied to a peripheral device in a wireless operation mode. As shown in FIGS. 1A and 1B, the power saving method at least comprises the following steps.

Firstly, in a step S10, the peripheral device is powered on.

Then, in a step S11, the peripheral device enters an idle mode.

Then, a step S12 is performed to judge whether the peripheral device has been operated in the idle mode for a time period longer than a first time interval. For example, the first time interval is 3 minutes, but is not limited thereto.

If the judging result of the step S12 indicates that the peripheral device has been operated in the idle mode for a time period longer than the first time interval, a step S13 is performed. In the step S13, the peripheral device enters a suspend mode. The power consumption amount of the peripheral device in the suspend mode is much lower than the power consumption amount of the peripheral device in the idle mode. The associated principles will be described later.

After the step S13, a step S14 is performed to judge whether the peripheral device receives a wakeup event. If the judging result of the step S14 indicates that the peripheral device does not receive a wakeup event, the step S14 is performed again. Whereas, if the judging result of the step S14 indicates that the peripheral device receives the wakeup event, the step S11 is repeatedly done. That is, the peripheral device enters the idle mode.

If the judging result of the step S12 indicates that the peripheral device has been operated in the idle mode for a time period not longer than the first time interval, a step S15 is performed to judge whether the peripheral device receives a startup trigger event. If the judging result of the step S15 indicates that the peripheral device does not receive the startup trigger event, the step S12 is repeatedly performed to judge whether the peripheral device has been operated in the idle mode for a time period longer than the first time interval.

If the judging result of the step S15 indicates that the peripheral device receives the startup trigger event, a step S16 is performed. In the step S16, the peripheral device enters a power saving mode from the idle mode.

In this context, the terms "idle mode", "power saving mode" and "suspend mode" have the following definitions.

In the idle mode, the light sources in some specified regions (or all regions) of the peripheral device are all in an on state (or a high-brightness state). Meanwhile, the peripheral device is in a high power consumption state. In the power saving mode, portions of the light sources in some specified regions (or all regions) of the peripheral device are in the on state (or the high-brightness state), but other portions of the light sources in the specified regions (or all regions) of the peripheral device are in an off state (or a low-brightness state). Meanwhile, the peripheral device is in a low power consumption state. In the suspend mode, the light sources in some specified regions (or all regions) of the peripheral device are all in the off state (or the low-brightness state). Meanwhile, the peripheral device is in a very low power consumption state.

Hereinafter, the operations of the peripheral device in the idle mode, the power saving mode and the suspend mode will be described by referring to an example of controlling the on/off states of the light sources in some specified regions. It is noted that the example is not restricted.

In this embodiment, the peripheral device has a specified region, which is also referred as an operation region. The peripheral device comprises plural light sources. Moreover, portions of the light sources are included in the operation region, and the other portions of the light sources are located outside the operation region.

For example, in case that the peripheral device is a mouse device, the operation region includes a mouse casing region and/or a mouse roller region of the mouse device that can be pressed, held or controlled by the user's hand. Alternatively, in case that the peripheral device is a keyboard device, the operation region includes a keypad region of the keyboard device with keys to be pressed by the user's hand. The example of the operation region will be described in more details with reference to FIGS. 3A and 3B or FIGS. 4A and 4B.

When the peripheral device is in the idle mode, the portions of the light sources in the operation region are in the on state or the high-brightness state. Meanwhile, the peripheral device is in the high power consumption state. When the peripheral device is in the power saving mode, at least one of the light sources in the operation region is in the off state or the low-brightness state. Meanwhile, the peripheral device is in the low power consumption state.

When the peripheral device is in the suspend mode (i.e., in the Step S13), the light sources included in the operation region and/or the light sources outside the operation region are all in the off state or the low-brightness state. Meanwhile, the peripheral device is in the very low power consumption state.

In other words, the power consumption amount of the peripheral device in the suspend mode is lower than the power consumption amount of the peripheral device in the power saving mode, and the power consumption amount of the peripheral device in the power saving mode is lower than the power consumption amount of the peripheral device in the idle mode.

From the above descriptions, the power saving method of the present invention is distinguished from the conventional technology. According to the present invention, at the time when the peripheral device receives the startup trigger event and is ready to frequently perform the actions of transmitting/receiving wireless data, the power consumption amount of some components is immediately stopped or decreased. Since the overall power supply of the peripheral device is effectively decreased, the power saving efficacy can be enhanced.

After the peripheral device enters the power saving mode (i.e., in the step S16), the following steps are performed.

Then, a step S17 is performed to judge whether the peripheral device has not received the startup trigger event for a second time interval.

If the peripheral device receives the startup trigger event within the second time interval, a step S18 is performed. Consequently, the peripheral device is continuously maintained in the power saving mode, and the step S17 is continuously performed. For example, the second time interval is 500 milliseconds, but is not limited thereto.

If the peripheral device has not received the startup trigger event for a time period longer than the second time interval, a step S19 is performed. Consequently, the peripheral device enters the idle mode from the power saving mode. That is, the step S11 is repeatedly done.

In other words, if the peripheral device has not received the startup trigger event for a time period longer than the second time interval, the light sources in the operation region are switched from the off state (or the low-brightness state) to the on state (or the high-brightness state), and the peripheral device is switched from the low power consumption state (or the power saving mode) to the high power consumption state (or the idle mode).

Hereinafter, a power saving method for a peripheral device in a wireless operation mode will be illustrated by referring to the light effect of one or some light sources of the peripheral device or the light sources in a specified region of the peripheral device.

Figure 2A:
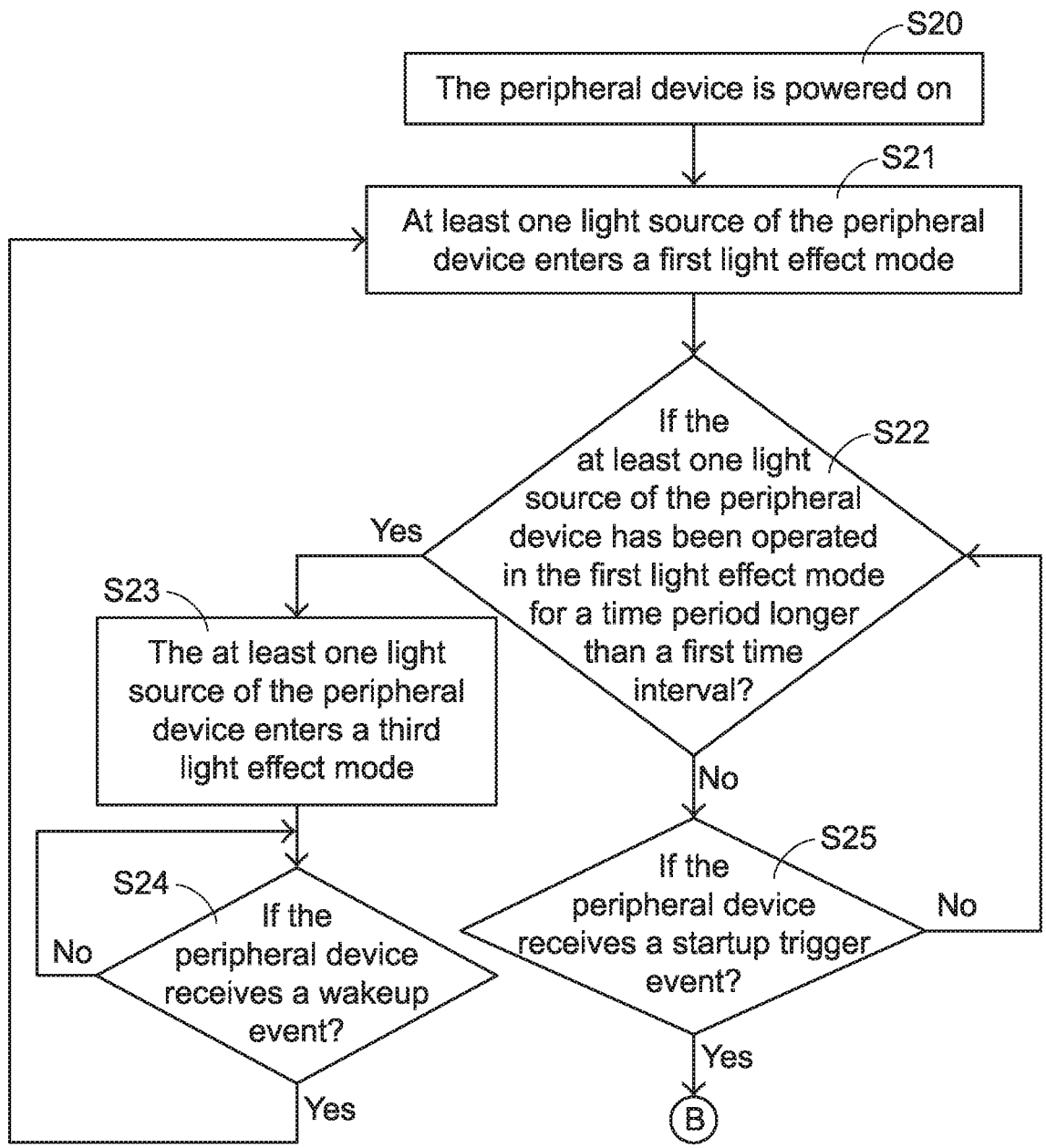
FIGS. 2A and 2B illustrate a flowchart of a power saving method according to a second embodiment of the present invention.
Figure 2B:
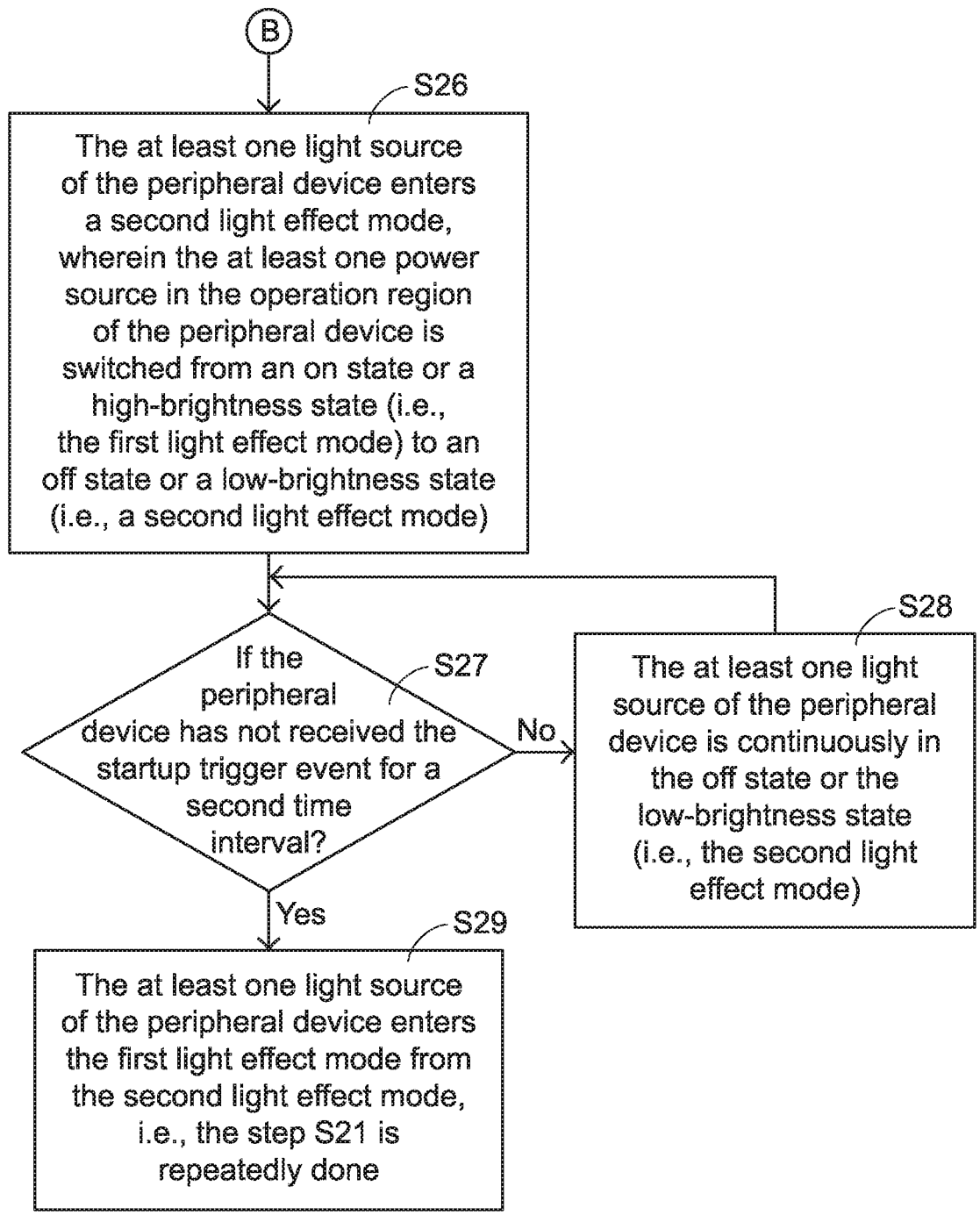

FIGS. 2A and 2B illustrate a flowchart of a power saving method according to a second embodiment of the present invention. The power saving method is applied to a peripheral device in a wireless operation mode. As shown in FIGS. 2A and 2B, the power saving method comprises the following steps.

Firstly, in a step S20, the peripheral device is powered on.

Then, in a step S21, at least one light source of the peripheral device enters a first light effect mode.

Then, a step S22 is performed to judge whether the at least one light source of the peripheral device has been operated in the first light effect mode for a time period longer than a first time interval. For example, the first time interval is 3 minutes, but is not limited thereto.

If the judging result of the step S22 indicates that the at least one light source of the peripheral device has been operated in the idle mode for a time period longer than the first time interval, a step S23 is performed. In the step S23, the peripheral device enters a third light effect mode. The power consumption amount of the peripheral device in the third light effect mode is much lower than the power consumption amount of the peripheral device in the first light effect mode. The associated principles will be described later.

After the step S23, a step S24 is performed to judge whether the peripheral device receives a wakeup event. If the judging result of the step S24 indicates that the peripheral device does not receive a wakeup event, the step S24 is performed again. Whereas, if the judging result of the step S24 indicates that the peripheral device receives the wakeup event, the step S21 is repeatedly done. That is, the peripheral device enters the first light effect mode.

If the judging result of the step S22 indicates that the at least one light source of the peripheral device has been operated in the first light effect mode for a time period not longer than the first time interval, a step S25 is performed to judge whether the peripheral device receives a startup trigger event. If the judging result of the step S25 indicates that the peripheral device does not receive the startup trigger event, the step S22 is repeatedly performed to judge whether the at least one light source of the peripheral device has been operated in the first light effect mode for a time period longer than the first time interval.

If the judging result of the step S25 indicates that the peripheral device receives the startup trigger event, a step S26 is performed. In the step S26, at least one of the at least one light source of the peripheral device in the first light effect mode is switched to a second light effect mode.

Like the first embodiment, the peripheral device of this embodiment also has an operation region. The peripheral device comprises at least one light source. Moreover, a portion of the at least one light source is included in the operation region, and another portion of the at least one light source is located outside the operation region.

For example, in case that the peripheral device is a mouse device, the operation region includes a mouse casing region and/or a mouse roller region of the mouse device that can be pressed, held or controlled by the user's hand. Alternatively, in case that the peripheral device is a keyboard device, the operation region includes a keypad region of the keyboard device with keys to be pressed by the user's hand. The example of the operation region will be described in more details with reference to FIGS. 3A and 3B or FIGS. 4A and 4B.

In the first light effect mode, the light sources included in the operation region and the light sources outside the operation region are all in the on state or the high-brightness state. In the second light effect mode, at least one of the light sources in the operation region is in the off state or the low-brightness state, but at least one of the light sources outside the operating region is still in the on state or the high-brightness state.

When the at least one light source of the peripheral device is in the third light effect mode (i.e., in the Step S23), the light sources included in the operation region and/or the light sources outside the operation region are all in the off state or the low-brightness state.

In other words, the power consumption amount of the peripheral device in the third light effect mode is lower than the power consumption amount of the peripheral device in the second light effect mode, and the power consumption amount of the peripheral device in the second light effect mode is lower than the power consumption amount of the peripheral device in the first light effect mode.

After the at least one light source of the peripheral device enters the second light effect mode (i.e., in the step S26), the following steps are performed.

Then, a step S27 is performed to judge whether the peripheral device has not received the startup trigger event for a second time interval.

If the peripheral device receives the startup trigger event within the second time interval, a step S28 is performed. Consequently, at least one of the at least one light source of the peripheral device is continuously maintained in the second light effect mode (i.e., in the off state or the low-brightness state). Then, the step S27 is repeatedly done. For example, the second time interval is 500 milliseconds, but is not limited thereto.

If the peripheral device has not received the startup trigger event for a time period longer than the second time interval, a step S29 is performed. Consequently, the at least one light source of the peripheral device enters the first light effect mode from the second light effect mode. That is, the step S21 is repeatedly done.

In the steps S28 and S29, the at least one of the at least one light source denotes at least one of the light sources that are included in the operation region.

In other words, if the peripheral device has not received the startup trigger event for a time period longer than the second time interval, at least one of the light sources in the operation region is switched from the off state or the low-brightness state (i.e., the second light effect mode) to the on state or the high-brightness state (i.e., the first light effect mode). Under this circumstance, the light sources located outside the operation region are maintained in the on state or the high-brightness state.

The applications of the power saving method on some examples the peripheral device will be described as follows.

Figure 3A:
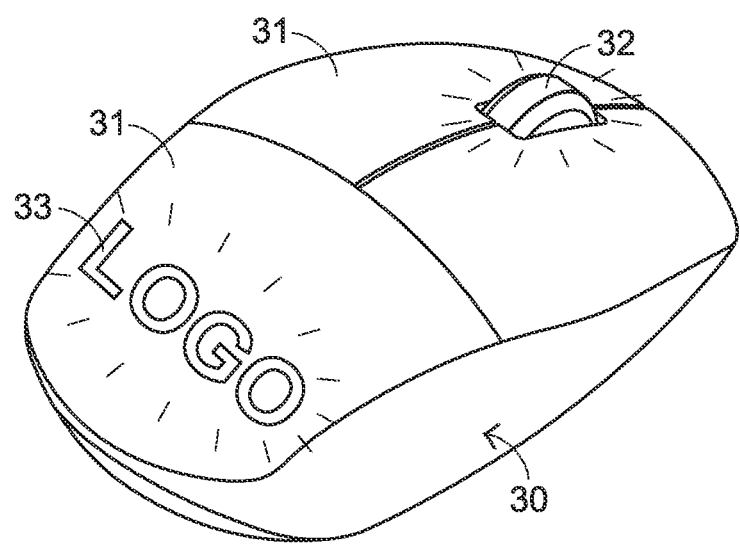
FIGS. 3A and 3B schematically a gaming mouse using the power saving method of the present invention.
Figure 3B:
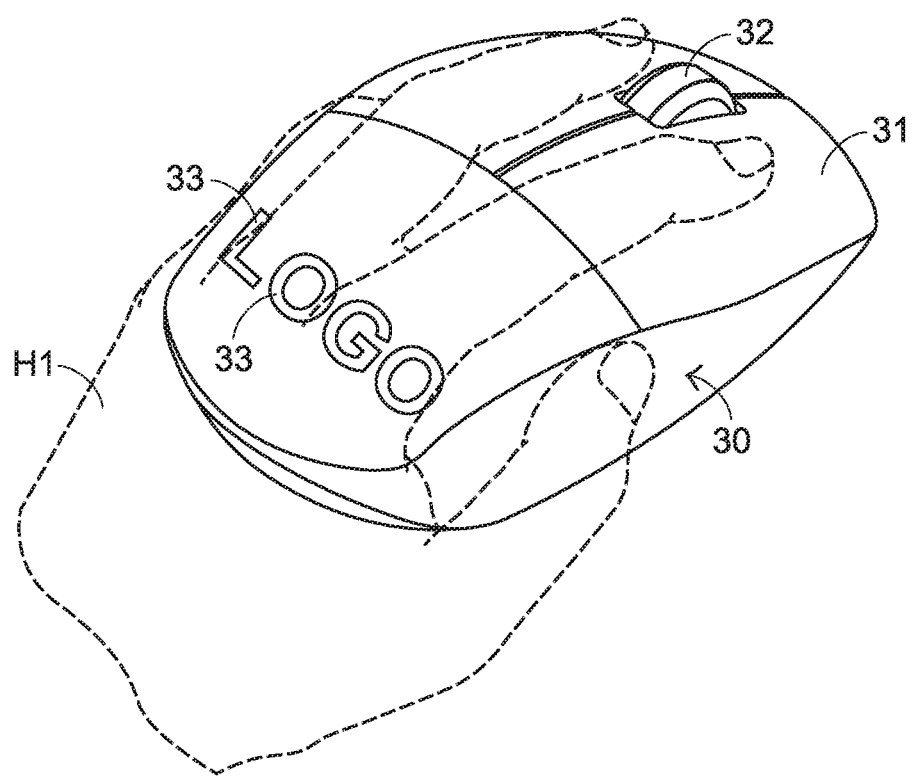

FIGS. 3A and 3B schematically a gaming mouse using the power saving method of the present invention. A mouse casing region 31 and/or a mouse roller region 32 of the gaming mouse 30 can be pressed, held or controlled by a user's hand H1 (see FIG. 3B). The mouse casing region 31 and/or a mouse roller region 32 can be used as an operation region of the gaming mouse 30.

In an embodiment, at least one LED light source (not shown) of the gaming mouse 30 is included in the operation region. As shown in FIG. 3A, the mouse casing region 31 has a hollow logo area 33. When the LED light source under the hollow logo area 33 is in the on state (or the high-brightness state), the light beams emitted by the LED light source can be transmitted through the hollow logo area 33. Moreover, at least one LED light source is located at a nearby vacant space of the mouse roller region 32. When the LED light source at the nearby vacant space of the mouse roller region 32 is in the on state (or the high-brightness state), the light beams emitted by the LED light source can be transmitted through the nearby vacant space of the mouse roller region 32. Under this circumstance, the gaming mouse 30 is in an idle mode (or in a first light effect mode). Preferably but not exclusively, the gaming mouse 30 is a wireless gaming mouse with a built-in battery.

In an embodiment, at least one light source (not shown) of the gaming mouse 30 is located outside the operation region. For example, the at least one light source is located at the front side, the right side or the left side of the gaming mouse 30. Consequently, the dazzling light effect can be further increased.

Please refer to FIG. 3B again. When the mouse casing region 31 and/or a mouse roller region 32 of the gaming mouse 30 is pressed, held or controlled by the user's hand H1, it is obviously found that a greater part of the hollow logo area 33 and a part of the mouse roller region 32 are sheltered by the palm of the user's hand H1 and some parts of the fingers of the user's hand H1. In this situation, the change of the light effect in the hollow logo area 33 and/or the mouse roller region 32 cannot be clearly seen from the outside. Consequently, as shown in FIG. 3B, the light sources in the hollow logo area 33 and/or the mouse roller region 32 are switched to an off state (or a low-brightness state) when the gaming mouse 30 is pressed, held or controlled by the user's hand H1 (i.e., a startup trigger event is continuously received by the gaming mouse 30). Under this circumstance, the gaming mouse 30 is switched from the idle mode (or the first light effect mode) to the power saving mode (or the second light effect mode). Consequently, the power consumption amount of the built-in battery of the gaming mouse 30 is largely decreased, and the service life of the battery is extended.

If the gaming mouse 30 judges that the at least one LED light source has been operated in the idle mode (or the first light effect mode) for a time period longer than a first time interval (e.g., 3 minutes), it means that the gaming mouse 30 has not received the startup trigger event for a certain time period. In this situation, the gaming mouse 30 enters a suspend mode (or a third light effect mode). In the suspend mode (or the third light effect mode), the light sources in the operation region are turned off (or the number or the brightness of the light sources in the operation region is decreased), or the light sources outside the operation region are turned off (or the number or the brightness of the light sources outside the operation region is decreased).

If the gaming mouse 30 in the power saving mode (or the second light effect mode) has not received the startup trigger event for a second time interval (e.g., 500 milliseconds), it means that the mouse casing region 31 and/or the mouse roller region 32 of the gaming mouse 30 has not been pressed, held or controlled by the user's hand H1 for a certain time period. Under this circumstance, the gaming mouse 30 is no longer in the power saving mode (or the second light effect mode), and the gaming mouse 30 enter the idle mode (or the first light effect mode) again. That is, the LED light sources in the hollow logo area 33 are switched to the off state (or the high-brightness state) again. In addition, the LED light source at the nearby vacant space of the mouse roller region 32 is switched to the on state (or the high-brightness state) again.

Figure 4A:
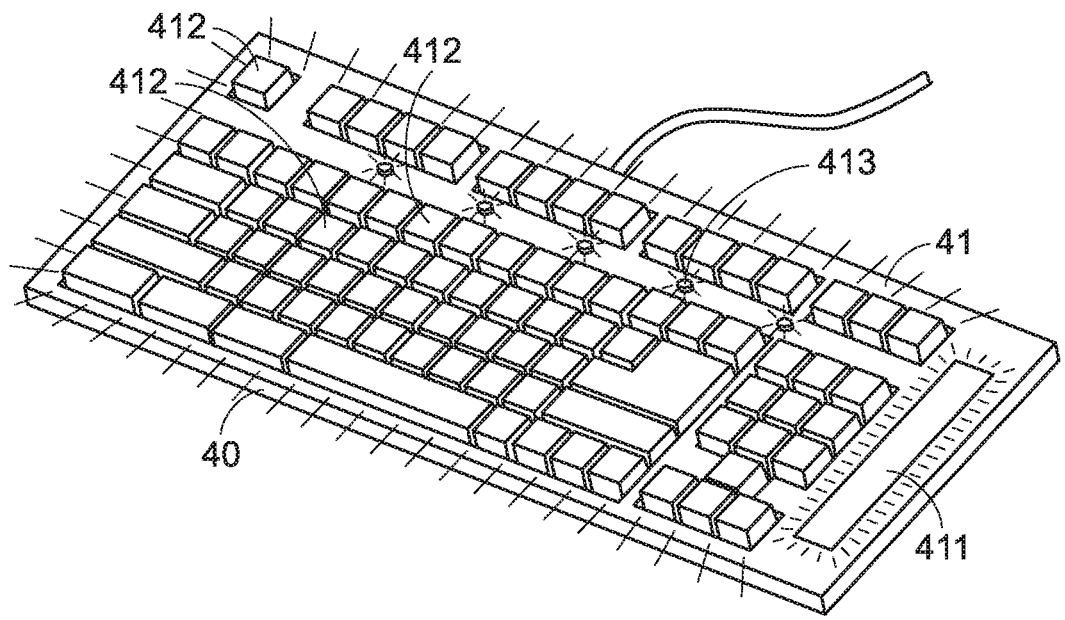
FIGS. 4A and 4B schematically a gaming keyboard using the power saving method of the present invention.
Figure 4B:
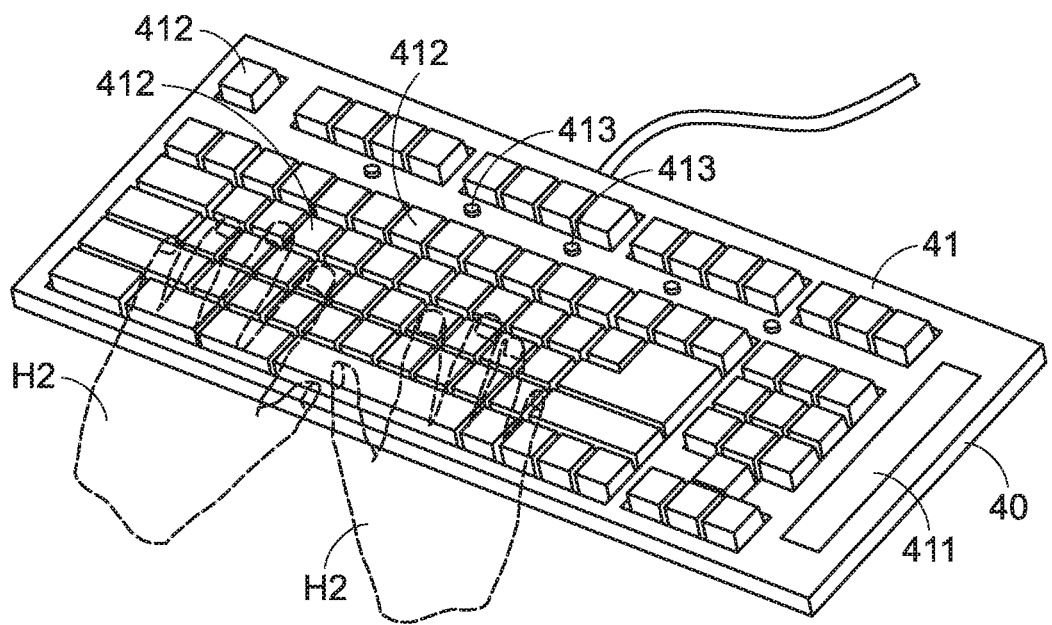

FIGS. 4A and 4B schematically a gaming keyboard using the power saving method of the present invention. A top surface 41 of the gaming keyboard 40 is equipped with a long LED light effect display area 411, plural keys 412 and plural LED light sources 413. The plural LED light sources 413 are distributed on the region between the plural keys 412. The plural keys 412 and the plural LED light sources 413 are included in an operation region. The operation region is a keypad region that can be pressed and operated by a user's hand H2 (see FIG. 4B). The long LED light effect display area 411 is located outside the operation region (i.e., the keypad region).

In an embodiment, at least one LED light source of the gaming keyboard 40 is included in the operation region (i.e., the keypad region). As shown in FIG. 4A, the LED light sources 413 are in an on state (or a high-brightness state). Moreover, at least one LED light source (not shown) is located at a nearby vacant space of at least one key 412 is also in the on state (or the high-brightness state). The light beams emitted by the LED light source can be transmitted through the nearby vacant space of the at least one key 412. Under this circumstance, the gaming keyboard 40 is in an idle mode (or in a first light effect mode). Moreover, at least one light source of the gaming keyboard 40 located outside the operation region (i.e., the keypad region). For example, the light source of the long LED light effect display area 411 is located outside the operation region. When the gaming keyboard 40 is in the idle mode (or the first light effect mode), the light source of the long LED light effect display area 411 emits the light beam. Consequently, the dazzling light effect can be further increased.

Preferably but not exclusively, the gaming keyboard 40 is a wired gaming keyboard 40 with a built-in battery. In addition, the gaming keyboard 40 can be operated in a wired operation mode or a wireless operation mode.

Please refer to FIG. 4B again. When the keys 412 of the gaming keyboard 40 in the wireless operation mode are pressed by the user's hand H2, it is obviously found that a part of the operation region (i.e., the keypad region) is sheltered by some parts of the fingers of the user's hand H2. In this situation, the change of the light effect in a portion of the operation region (i.e., the keypad region) cannot be clearly seen from the outside. In order to prevent the light beams of the LED light sources from directly irradiating and irritating the user's eyes, as shown in FIG. 4B, the light sources in the operation region (i.e., the keypad region) are switched to an off state (or a low-brightness state) when the gaming keyboard 40 is in a pressed state (i.e., a startup trigger event is continuously received by the gaming keyboard 40). Under this circumstance, the gaming keyboard 40 is switched from the idle mode (or the first light effect mode) to the power saving mode (or the second light effect mode). Consequently, the power consumption amount of the built-in battery of the gaming keyboard 40 is largely decreased, and the service life of the battery is extended.

In some embodiments, the light source outside the operation region (i.e., the keypad region), e.g., the long LED light effect display area 411, is also switched to the off state (or the low-brightness state) when the gaming keyboard 40 is in the pressed state (i.e., the start trigger event is continuously received by the gaming keyboard 40). Consequently, the power consumption amount of the battery is further decreased.

If the gaming keyboard 40 judges that the at least one light source has been operated in the idle mode (or the first light effect mode) for a time period longer than a first time interval (e.g., 3 minutes), it means that the gaming keyboard 40 has not received the startup trigger event for a certain time period. In this situation, the gaming keyboard 40 enters a suspend mode (or a third light effect mode). In the suspend mode (or the third light effect mode), the light sources in the operation region are turned off (or the number or the brightness of the light sources in the operation region is decreased), or the light sources outside the operation region are turned off (or the number or the brightness of the light sources outside the operation region is decreased).

Preferably but not exclusively, the startup trigger event for starting the peripheral device is a motion sensing event, a pressing action sensing event, a touch action sensing event, a proximity sensing event, or a combination thereof.

Preferably but not exclusively, in each of the first light effect mode, the second light effect mode and the third light effect mode, the light sources emit light beams in a flickering manner, a breathing manner, a segmented continuous-bright manner, a gradient change manner, or a combination thereof.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A power saving method for a peripheral device in a wireless operation mode, the power saving method at least comprising steps of:

allowing the peripheral device to enter an idle mode;

judging whether the peripheral device receives a startup trigger event;

if the peripheral device does not receive the startup trigger event, repeatedly performing the step of judging whether the peripheral device receives the startup trigger event; and if the peripheral device receives the startup trigger event, allowing the peripheral device to enter a power saving mode from the idle mode, wherein the peripheral device in the power saving mode consumes less electric power than the peripheral device in the idle mode, wherein the peripheral device has an operation region, and the peripheral device comprises plural light sources, wherein first portions of the plural light sources are included in the operation region, and second portions of the plural light sources are located outside the operation region, wherein when the peripheral device is in the idle mode, the light sources in the operation region are in an on state or a high-brightness state, so that the peripheral device is in a high power consumption state, wherein when the peripheral device is in the power saving mode, at least one of the light sources in the operation region is in an off state or a low-brightness state, so that the peripheral device is in a low power consumption state, wherein the peripheral device is a mouse device, and the operation region includes a mouse casing region and/or a mouse roller region of the mouse device to be pressed, held or controlled by a user's hand; or the peripheral device is a keyboard device, the operation region includes a keypad region of the keyboard device with keys to be pressed by the user's hand.

2. The power saving method according to claim 1, wherein after the peripheral device enters the idle mode, the power saving method further comprises steps of:

judging whether the peripheral device has been operated in the idle mode for a time period longer than a first time interval;

if the peripheral device has been operated in the idle mode for the time period longer than the first time interval, allowing the peripheral device to enter a suspend mode; and if the peripheral device has been operated in the idle mode for the time period not longer than the first time interval, repeatedly performing the step of judging whether the peripheral device receives the startup trigger event, wherein if the peripheral device does not receive the startup trigger event, the step of judging whether the peripheral device has been operated in the idle mode for the time period longer than the first time interval is repeatedly performed, wherein the peripheral device in the suspend mode consumes less electric power than the peripheral device in the power saving mode.

3. The power saving method according to claim 2, wherein after the peripheral device enters the suspend mode, the power saving method further comprises steps of:

judging whether the peripheral device receives a wakeup event;

if the peripheral device does not receive the wakeup event, repeatedly performing the step of judging whether the peripheral device receives the wakeup event; and if the peripheral device receives the wakeup event, performing the step of allowing the peripheral device to enter the idle mode.

4. The power saving method according to claim 2, wherein when the peripheral device is in the suspend mode, the first portions of the plural light sources and/or the second portions of the plural light sources are all in an off state or a low-brightness state, so that the peripheral device is in a very low power consumption state.

5. The power saving method according to claim 1, wherein after the peripheral device enters the power saving mode, the power saving method further comprises steps of:
  judging whether the peripheral device has not received the startup trigger event;
  if the peripheral device has not received the startup trigger event for a time period not longer than a second time interval, allowing the peripheral device to be maintained in the power saving mode, and repeatedly performing the step of judging whether the peripheral device has not received the startup trigger event; and
  if the peripheral device has not received the startup trigger event for the time period longer than the second time interval, allowing the peripheral device to enter the idle mode from the power saving mode.

6. The power saving method according to claim 1, wherein the peripheral device is operated in the wireless operation mode only, or the peripheral device is selectively operated in the wireless operation mode or a wired operation mode.

7. A power saving method for a peripheral device in a wireless operation mode, the power saving method at least comprising steps of:
  allowing at least one light source of the peripheral device to enter a first light effect mode;
  judging whether the peripheral device receives a startup trigger event;
  if the peripheral device does not receive the startup trigger event, repeatedly performing the step of judging whether the peripheral device receives the startup trigger event; and
  if the peripheral device receives the startup trigger event, allowing at least one of the at least one light source of the peripheral device in the first light effect mode to be switched to a second light effect mode,
  wherein the at least one light source of the peripheral device in the second light effect mode consumes less electric power than the at least one light source of the peripheral device in the first light effect mode,
  wherein the peripheral device has an operation region, wherein a first portion of the at least one light source of the peripheral device is included in the operation region, and a second portion of the at least one light source of the peripheral device is located outside the operation region,
  wherein when the at least one light source of the peripheral device is in the first light effect mode, the first portion of the at least one light source in the operation region and the second portion of the at least one light source outside the operation region are in an on state or a high-brightness state, wherein when the at least one light source of the peripheral device is in the second light effect mode, at least one of the first portion of the at least one light source is in an off state or a low-brightness state, and at least one of the second portion of the at least one light source is still in the on state or the high-brightness state,
  wherein the peripheral device is a mouse device, and the operation region includes a mouse casing region and/or a mouse roller region of the mouse device to be pressed, held or controlled by a user's hand; or the peripheral device is a keyboard device, the operation region includes a keypad region of the keyboard device with keys to be pressed by the user's hand.

8. The power saving method according to claim 7, wherein after the at least one light source of peripheral device enters the first light effect mode, the power saving method further comprises steps of:
  judging whether the at least one light source of the peripheral device has been operated in the first light effect mode for a time period longer than a first time interval;
  if the at least one light source of the peripheral device has been operated in the first light effect mode for the time period longer than the first time interval, allowing the at least one light source of the peripheral device to enter a third light effect mode; and
  if the at least one light source of the peripheral device has been operated in the first light effect mode not longer than the first time interval, repeatedly performing the step of judging whether the peripheral device receives the startup trigger event, wherein if the peripheral device does not receive the startup trigger event, repeatedly performing the step of judging whether the at least one light source of the peripheral device has been operated in the first light effect mode for the time period longer than the first time interval,
  wherein the at least one light source of the peripheral device in the third light effect mode consumes less electric power than the at least one light source of the peripheral device in the second light effect mode.

9. The power saving method according to claim 8, wherein after the at least one light source of the peripheral device enters the third light effect mode, the power saving method further comprises steps of:
  judging whether the peripheral device receives a wakeup event;
  if the peripheral device does not receive the wakeup event, repeatedly performing the step of judging whether the peripheral device receives the wakeup event; and
  if the peripheral device receives the wakeup event, repeatedly performing the step of allowing the at least one light source of the peripheral device to enter the first light effect mode.

10. The power saving method according to claim 8, wherein when the at least one light source of the peripheral device is in the third light effect mode, the first portion of the at least one light source in the operation region and/or the second portion of the at least one light source outside the operation region are in an off state or a low-brightness state.

11. The power saving method according to claim 7, wherein after the at least one of the at least one light source of the peripheral device enters the second light effect mode, the power saving method further comprises steps of:
  judging whether the peripheral device has not received the startup trigger event;
  if the peripheral device has not received the startup trigger event for a time period not longer than a second time interval, allowing the at least one of the at least one light source to be maintained in the second light effect mode, and performing the step of judging whether the peripheral device has not received the startup trigger event; and
  if the peripheral device has not received the startup trigger event for the time period longer than the second time interval, allowing at least one of the at least one light source of the peripheral device in the second light effect mode to be switched to the first light effect mode.

12. The power saving method according to claim 7, wherein the peripheral device is operated in the wireless operation mode only, or the peripheral device is selectively operated in the wireless operation mode or a wired operation mode.

\* \* \* \* \*